US012776004B2

(12) United States Patent
Jensen

(10) Patent No.: US 12,776,004 B2

(45) Date of Patent: Oct. 27, 2026

(54) COMPUTER-IMPLEMENTED METHOD FOR MODELLING A PROJECTION OF A SCENE IN THREE-DIMENSIONAL SPACE INTO A COMPOSITE IMAGE

(71) Applicant: Brainlab SE, Munich (DE)

(72) Inventor: Grady Jensen, Munich (DE)

(73) Assignee: BRAINLAB SE, Munich (DE)

( * ) Notice: Subject to any disclaimer, the term of this patent is extended or adjusted under 35 U.S.C. 154(b) by 29 days.

(21) Appl. No.: 18/717,143

(22) PCT Filed: Dec. 19, 2022

(86) PCT No.: PCT/EP2022/086776

§ 371 (c)(1),
(2) Date: Jun. 6, 2024

(87) PCT Pub. No.: WO2024/132098

PCT Pub. Date: Jun. 27, 2024

(65) Prior Publication Data

US 2025/0328989 A1 Oct. 23, 2025

(51) Int. Cl.
*G06T 5/50* (2006.01)
*G06T 5/80* (2024.01)
(Continued)

(52) U.S. Cl.
CPC .................. *G06T 5/50* (2013.01); *G06T 5/80* (2024.01); *G06T 7/80* (2017.01); *H04N 23/698* (2023.01); *G06T 2207/20221* (2013.01)

(58) Field of Classification Search
CPC .... G06T 5/50; G06T 7/80; G06T 5/80; G06T 2207/20221; H04N 23/698
See application file for complete search history.

(56) References Cited

U.S. PATENT DOCUMENTS 8,917,317 B1 * 12/2014 Beeler ........................ G06T 7/85 348/47
9,998,664 B1 * 6/2018 Long .................... H04N 13/189
(Continued)

FOREIGN PATENT DOCUMENTS

CN 112669199 A 4/2021
CN 113132708 A 7/2021

OTHER PUBLICATIONS

Guan J, Deboeverie F, Slembrouck M, van Haerenborgh D, van Cauwelaert D, Veelaert P, Philips W. Extrinsic Calibration of Camera Networks Using a Sphere. Sensors (Basel). Aug. 4, 2015;15(8):18985-9005. doi: 10.3390/s150818985. PMID: 26247950; PMCID: PMC4570356. (Year: 2015).*

(Continued)

*Primary Examiner* — Yu Chen
(74) *Attorney, Agent, or Firm* — Gray Ice Higdon

(57) ABSTRACT

A computer-implemented method for modelling a projection of a scene in three-dimensional space into a composite image by a camera system comprising a plurality of cameras is presented. In particular, in this method the scene is subsequently projected onto a plurality of camera unit spheres and a compositing unit sphere. Each camera unit sphere of the plurality of camera unit spheres represents one camera of the plurality of cameras, respectively. The compositing unit sphere unifies the plurality of camera unit spheres, wherein a compositing unit sphere centre of the compositing unit sphere is equally distanced by a unified offset to each camera unit sphere centres of the plurality of camera unit spheres. A radius of the camera unit spheres and the compositing unit sphere corresponds to an alignment distance, wherein the alignment distance relates to an extrinsic distance between the camera system and a point of interest. Thus, the proposed method inter alia allows to improve the modelling of a projection of a scene in three (Continued)

dimensional space into a composite image by a camera system comprising a plurality of cameras in view of parallax. In particular, a parallax of zero can be achieved at the alignment distance.

20 Claims, 2 Drawing Sheets

(51) Int. Cl.
*G06T 7/80* (2017.01)
*H04N 23/698* (2023.01)

(56) References Cited

U.S. PATENT DOCUMENTS

| | | | | |
|---|---|---|---|---|
| 2017/0331986 | A1* | 11/2017 | Houba | H04N 23/698 |
| 2019/0132576 | A1* | 5/2019 | Zhang | H04N 23/90 |
| 2019/0394484 | A1* | 12/2019 | Rose | H04N 19/523 |
| 2020/0120326 | A1* | 4/2020 | Deshpande | H04N 21/816 |
| 2022/0327727 | A1* | 10/2022 | Pérez Cortés | H04N 23/90 |
| 2024/0046596 | A1* | 2/2024 | Su | H04N 5/265 |

OTHER PUBLICATIONS

International Searching Authority; International Search Report and Written Opinion issued in Application No. PCT/EP2022/086776, 17 pages, dated Jul. 31, 2023.

Usenko Vladyslav et al: "The Double Sphere Camera Model", 2018 International Conference on 3D Vision (3DV), IEEE, pp. 552-560, XP033420133, DOI: 10.1109/3DV.2018.00069, dated Sep. 5, 2018.

Varun Ravi Kumar et al: "Surround-view Fisheye Camera Perception for Automated Driving: Overview, Survey and Challenges", arxiv.org, Cornell University Library, 201 Olin Library Cornell University Ithaca, NY 14853, XP091233099, dated May 26, 2022.

Varun Ravi Kumar: "Surround-View Cameras based Holistic Visual Perception for Automated Driving", arxiv.org, Cornell University Library, 201 Olin Library Cornell University Ithaca, NY 14853, XP091245277, dated Jun. 11, 2022.

The China National Intellectual Property Administration, First Office Action issued in Application No. 2022800868159, 11 pages, dated Aug. 28, 2026.

* cited by examiner

COMPUTER-IMPLEMENTED METHOD FOR MODELLING A PROJECTION OF A SCENE IN THREE-DIMENSIONAL SPACE INTO A COMPOSITE IMAGE

FIELD OF THE INVENTION

The present invention relates to a computer-implemented method for modelling a projection of a scene in three-dimensional space into a composite image by a camera system comprising a plurality of cameras, a computer-implemented method of providing a composite image of a scene using a camera system comprising a plurality of cameras, a corresponding data apparatus and a corresponding computer program.

TECHNICAL BACKGROUND

When providing a composite image of a scene using a camera system comprising a plurality of cameras, a projection of the scene in three-dimensional space into the composite image needs to be determined. Thus, the plurality of cameras, in particular the lenses of the cameras, need to be modelled to determine the projection.

Known approaches include the usage of a pinhole camera model, or another camera model such as the double sphere model, to model the projection of points of the scene into a composite image by a camera system. For composite images that are determined by a camera system comprising a plurality of cameras, parallax is a common problem. Parallax is the displacement in the apparent position of an object viewed along different lines of sight. As the plurality of cameras cannot occupy the same physical space, parallax leads to errors in the composite image e.g. in missing information or the double presentation of information.

Consequently, there is a need for a method of modelling the projection of a scene in three dimensional space into a composite image by a camera system comprising a plurality of cameras with reduced parallax.

The present invention has the objective of improving the modelling of a projection of a scene in three dimensional space into a composite image by a camera system comprising a plurality of cameras in view of parallax.

Aspects of the present invention, examples and exemplary steps and their embodiments, are disclosed in the following, Different exemplary features of the invention can be combined in accordance with the invention wherever technically expedient and feasible.

Exemplary Short Description of the Invention

In the following, a short description of the specific features of the present invention is given which shall not be understood to limit the invention only to the features or a combination of the features described in this section.

A computer-implemented method for modelling a projection of a scene in three-dimensional space into a composite image by a camera system comprising a plurality of cameras is presented.

In particular, in this method the scene is subsequently projected onto a plurality of camera unit spheres and a compositing unit sphere. Each camera unit sphere of the plurality of camera unit spheres represents one camera of the plurality of cameras, respectively. The compositing unit sphere unifies the plurality of camera unit spheres, wherein a compositing unit sphere the centre of the compositing unit sphere is equally distanced by a unified offset to each camera unit sphere centre of the plurality of camera unit spheres. A radius of the camera unit spheres and the compositing unit sphere corresponds to an alignment distance, wherein the alignment distance relates to an extrinsic distance between the camera system and a point of interest. Thus, the proposed method inter alia allows improved modelling of a projection of a scene in three dimensional space into a composite image by a camera system comprising a plurality of cameras in view of parallax. In particular, a parallax of zero can be achieved at the alignment distance.

GENERAL DESCRIPTION OF THE INVENTION

In this section, a description of the general features of the present invention is given, for example, by referring to possible embodiments of the invention.

The present invention is defined by the subject-matter of the independent claims. Additional features of the invention are presented in the dependent claims.

According to an aspect of the present disclosure, a computer-implemented method for modelling a projection of a scene in three-dimensional space into a composite image by a camera system comprising a plurality of cameras, comprises the following step: Subsequently projecting the scene onto a plurality of camera unit spheres and a compositing unit sphere. Each camera unit sphere of the plurality of camera unit spheres represents one camera of the plurality of cameras, respectively. The compositing unit sphere unifies the plurality of camera unit spheres, wherein a compositing unit sphere centre of the compositing unit sphere is equally distanced by a unified offset to each camera unit sphere centre of the plurality of camera unit spheres. A radius of the camera unit spheres and the compositing unit sphere corresponds to an alignment distance, wherein the alignment distance relates to an extrinsic distance between the camera system and a point of interest.

The term "scene", as used herein, comprises a three dimensional view of an area, in particular a room, further in particular an operation room. The scene is also referred to as area of interest, which is monitored by the camera system.

The term "composite image", as used herein, relates to an image that is composed, or in other words put together, from a plurality of captured images from different image sources, in particular a camera system comprising a plurality of cameras. Preferably, the composite image covers a 360 degree view of the scene.

The term "unit sphere", as used herein, relates to a sphere with a radius of 1.

The term "unifies", as used here, relates to a method in which values, or data in general, have their discrepancies consolidated. These discrepancies can have many different sources. For example, random noise in the sampling amongst a plurality of devices sensors or error caused by parallax are common sources when working with a plurality of cameras.

The term "extrinsic distance", as used herein, relates to a distance in the real world. In other words, the extrinsic distance expresses the distance between the camera system and a point of interest. A point of interest is, for example, an operating table with a patient laying on it while the camera system is monitoring the room attached to the ceiling; the extrinsic distance is then the number of meters between the camera and a point on the patient. In another example, the extrinsic distance expresses the distance between the cameras in the camera system, though, as in real life, the plurality of cameras cannot occupy the same physical space at the same point in time.

In other words, the unified offset is defined by a magnitude of a vector between the compositing unit sphere centre and the camera unit sphere centres. Further, the unified offset is an offset that is scaled to the unit spheres. In other words, the unified offset reflects the extrinsic distance between cameras of the camera system as well as the alignment distance of the system scaled to the unit sphere.

In other words, there are multiple image planes, one for each camera. This is the raw information that is available. The sensor of each camera is viewing the scene. The pixels are reprojected from each individual camera back out onto the compositing sphere. For high level understanding, a point in the scene which is viewable by multiple cameras—and is the alignment distance away from the centre of the composite sphere—is projected onto the composite sphere, then the camera spheres and then the image planes of the cameras. As the algorithm only has the raw pixels, the flow of the algorithm procedes in the opposite direction as the description just given. Namely, from the image planes of the cameras, onto the camera spheres, and then converging onto the composite sphere.

While the radius of the camera unit spheres and the compositing unit sphere corresponds to an alignment distance, wherein the alignment distance relates to an extrinsic distance between the camera system and a point of interest, the definition of a unit sphere is that it has a radius of 1. However, in reality the only thing that changes in the representation is the unified offset.

In other words, the method using the compositing unit sphere, which is also referred to as triple sphere model, can be interpreted as a generalization of a known double sphere approach, wherein the double sphere approach the entire camera system is represented by the double sphere model, though each camera can still have their own separate model parameters. The method as described herein introduces the compositing unit sphere that unifies camera unit spheres, which might for example be represented by a double sphere model each. Thus, an extrinsic distance between the plurality of cameras is represented in the method as described herein by the unified offset. In comparison, the double sphere approach does not consider the distance between the plurality of cameras and as such does not include any unified offset, i.e. it assumes the cameras share the same physical location.

The method allows one to provide a composite image, wherein points of interest of the scene, which are distanced by the alignment distance to the camera system can be determined without parallax error, A plane in the three dimensional room of the scene that is distanced to the camera system at the alignment distance is referred to as alignment plane.

Furthermore, in addition, the method allows one to provide a composite image, wherein points of interest of the scene, which are distanced by an alignment distance range to the camera system and suffer from discrepancies in data amongst cameras can be determined with a relatively low parallax error. An area in the three dimensional room of the scene that is defined by the alignment plane extended towards and away from the camera is referred to as alignment area. This alignment area is determined by the physical distance between cameras, the distance of the alignment plane from the centre of the compositing sphere in three dimensional space, and a user defined offset. Given these parameters it is possible to bound the amount of error in this area using real-world metrics like centimeters instead of being forced to rely on camera centric metrics like pixels. For example, for a given plurality of cameras and a given alignment distance, it could be calculated that the error due to parallax in the area defined by 60 cm in front of the alignment plane, i.e. towards the cameras, and 60 cm behind, i.e. away from the cameras, is less than 1 cm. In other words, this method provides a bridge between extrinsic metrics and camera space metrics, the latter of which are more difficult for users of the system to intuitively understand.

Furthermore, the method, when used with appropriate large field-of-view camera lenses, allows one to provide a proper coverage of 360 degrees, in particular, for a composite panorama image with a camera system comprising only two cameras. This allows for a reduction in the necessary processing power when determining the composite image. Furthermore, when used in combination with spherical projection camera models, e.g. double sphere or the extended unified camera model, this general model provides a closed-form inverse projection and avoids the use of computationally expensive trigonometric functions. This allows for fast projection, as well as inverse projection, and facilitates efficient implementation on low-power graphical processing units (GPUs) as well as field programmable gate arrays (FPGAs).

Thus, an improved method for modelling a projection of a scene in three-dimensional space into a composite image by a camera system comprising a plurality of cameras is provided.

According to another exemplary embodiment of the present invention, subsequently projecting the scene onto a plurality of camera unit spheres and a compositing unit sphere comprises the following steps: One step comprises transforming the points of the scene from image coordinates into camera coordinates. Another step comprises transforming the points of the scene from the camera coordinates into extrinsic coordinates, wherein the compositing unit sphere centre defines a coordinate system centre of the camera coordinate system.

In other words, a point of interest in the scene in the real world can be expressed in extrinsic coordinates with three dimensions. The extrinsic coordinates are also referred to as world coordinates. The camera coordinates preferably comprise three dimensions. The image coordinates preferably comprise two dimensions, as images are two dimensional.

In other words, the camera images are provided and the cameras are calibrated to determine their intrinsic and extrinsic matrices. This tells the user how the pixel on the sensor would be projected back into the scene if only one camera was being used. When two cameras are being used, the problem occurs that because of parallax, there are some points, where the view of the cameras overlap, that have discrepancies. This method is a way of addressing those discrepancies.

In other words, transforming the points of the scene from image coordinates into camera coordinates reflects a projection of the scene from image planes of the cameras onto the plurality of camera unit spheres. Furthermore, a projection of the scene from the plurality of camera unit spheres onto the composite unit sphere is reflected by an expression of the points of the scene with respect to a new origin, which is the position of the respective camera within the offset coordinate system offset by the unified offset. Transforming points of the scene from camera coordinates into extrinsic coordinates reflects a projection of the scene from the composite unit sphere into the world.

Transforming the scene back to extrinsic coordinates might be problematic due to a lack of depth information. Preferably, it is transformed into a ray along which the real extrinsic coordinate for the point lies.

According to another exemplary embodiment of the present invention, before subsequently projecting the scene onto a plurality of camera unit spheres and a compositing unit sphere, the method comprises the following steps: One step comprises acquiring the alignment distance. Another step comprises determining a common origin for the compositing unit sphere where extrinsic distances amongst cameras in the plurality of cameras are used. Another step comprises determining the unified offset using the alignment distance and common origin for the compositing unit sphere.

The method allows one to dynamically adjust the projection of the scene into the composite image depending on the alignment distance. In other words, the unified offset is scaled in accordance with the alignment distance and reflects the extrinsic camera distance.

Preferably, the unified offset β is defined by $$\beta := \text{abs}\left(\frac{t/2}{dist}\right)$$

wherein t is the extrinsic camera distance and wherein dist is the alignment distance. Furthermore, β refers to only a single axis and is valid for two cameras, as written here.

In order to use this method, the following steps are executed. Obtaining the alignment distance, in particular by user input, and calculating the origin for the composite sphere using extrinsic translation information from the calibration of the plurality of cameras.

Preferably, the extrinsic camera distance is expressed by a three dimensional vector. In the case of the camera system comprising two cameras, the extrinsic camera distance could have only one component, for example an offset in z-direction of an x-y-z-coordinate system if the cameras were in a back-to-back orientation. Thus, when transforming the scene into camera coordinates, the centre of the respective camera unit spheres is defined by (0, 0, −β) and (0, 0, β) based on an extrinsic camera distance of (0, 0, tz). However, if translational x-offset and/or y-offset between the cameras is present, the extrinsic camera distance is defined by (tx, ty, tz). Thus, for three axis correction, the unified offset is expressed as $$\left(\pm\frac{tx/2}{dist}, \pm\frac{ty/2}{dist}, \pm\beta\right).$$

For more than 2 cameras, the cameras should be positioned in such a way that the extrinsic distances are equal in relation to a common centre. For example, when using 3 cameras, their distances to each other should reflect an equilateral rectangle. For 4 cameras, a square . . . etc. It has to be a configuration in which it is possible to find a common origin for all cameras in which the magnitude of the vector from the origin to the camera position is the same for all cameras.

In a scenario with two cameras and an offset in x-y- and z-direction, the y-offset and x-offset the scene as well as the z-offset are used and the following steps are executed. Obtaining the alignment distance, in particular by user input and the extrinsic camera distance (which in this case also can be referred to as extrinsic camera translation).

Thus, the method as described herein allows one to dynamically adjust the modelling of the projection of the scene into the composite image depending on a point of interest and/or a region of interest in the scene.

According to another exemplary embodiment of the present invention, the alignment distance is input by a user. The extrinsic distance between the plurality of cameras of the camera system is known from the properties of the camera system.

In other words, depending on the used camera system, the extrinsic distance between the plurality of cameras of the camera system is provided. Furthermore, depending on the point of interest and/or region of interest in the scene, the alignment distance is provided. The method thus allows modelling the projection of the scene into the composite image, wherein in the alignment plane the error caused by parallax is zero and in the alignment area the parallax is reduced and represented in extrinsic coordinate metrics such as centimeters.

Thus, in practical use, the extrinsic distance between the plurality of cameras of the camera system is only defined once when working with the same camera system, while the alignment distance is defined dynamically depending on the application.

The smaller the extrinsic distance amongst cameras, the larger the alignment area where the parallax is reduced. For example, for a camera system where the extrinsic distance between cameras is 5 cm versus a system where the extrinsic distance between cameras is 7 cm, the former will have a larger alignment area for a fixed error size. If the fixed error size is 1 cm of error due to parallax, then the camera with 5 cm extrinsic distance will have a larger alignment area where the error due to parallax is <=1 in comparison to the cameras with 7 cm extrinsic distance.

According to another exemplary embodiment of the present invention, each camera unit sphere of the plurality of camera unit spheres are each represented by a camera model.

According to another exemplary embodiment of the present invention, the camera model comprises a pinhole camera model, a unified camera model, an extended unified camera model, a Kannala-Brandt camera model, a field-of-view camera model or a double sphere camera model.

According to another exemplary embodiment of the present invention, the alignment distance relates to an extrinsic distance between the coordinate system centre of the camera coordinate system, i.e. the origin of the compositing sphere in world coordinates, and a point of interest, where parallax is minimized.

According to another exemplary embodiment of the present invention, the composite image is a panorama image.

Preferably, the panorama image is a two-dimensional spherical panorama image, as the composite image is determined from a projection of the camera unit spheres.

According to another exemplary embodiment of the present invention, a field-of-view used from each of the plurality of cameras for the composite image is dependent on the alignment distance.

The unified offset is directly dependent on the alignment distance. The bigger the unified offset, the further apart the two cameras are within the compositing unit sphere. For the same alignment distance, the larger the unified offset, the larger field-of-view of each camera that contributes to the composite image.

According to another exemplary embodiment of the present invention, a lower alignment distance leads to a larger field-of-view used from each of the plurality of cameras for the composite image.

In other words, the unified offset is directly dependent on the alignment distance. The larger the unified offset, i.e. the further apart the two cameras are within the compositing unit sphere, the greater the field-of-view of each camera used within the composed image.

According to another exemplary embodiment of the present invention, the plurality of cameras are large field-of-view cameras.

In comparison, a pinhole camera is suboptimal for viewing angles larger than 120 degrees. Thus, in order to horizontally cover 360 degrees of view, a large quantity of pinhole cameras would be necessary.

According to another exemplary embodiment of the present invention, the large field-of-view cameras comprise a field-of-view that is larger than 180 degrees.

Thus, in order to horizontally cover 360 degrees of view, only two large field-of-view cameras are necessary.

According to another exemplary embodiment of the present invention, the large field-of-view cameras comprise a camera with a fish-eye lens.

According to another aspect of the present invention, a computer-implemented method of providing a composite image of a scene using a camera system comprising a plurality of cameras, comprises the following steps: Precomputing a representation of the camera system, comprising a plurality of camera unit spheres and a compositing unit sphere. Creating a composite image from individual camera images of the plurality of cameras using the a computer-implemented method for modelling a projection of a scene in three-dimensional space into a composite image by a camera system comprising a plurality of cameras, as described herein. Applying final distortion correction or optimizing parallax correction to the composite image.

According to another exemplary embodiment of the present invention, pre-computing the representation of the camera system comprises: Calibrating the representation of the camera system. Performing direct alignment or feature based alignment.

According to another exemplary embodiment of the present invention, creating the composite image from individual camera images of the plurality of cameras comprises: Finding seam lines amongst camera images that are viewing similar parts of the scene. Blending a content, i. e. a number of pixels, of each of the camera images that share a seam line.

Preferably, blending the content of each of the camera images that share a seam line comprises performing exposure correction.

According to another aspect of the present invention, a data processing apparatus comprises means for carrying out the computer-implemented method for modelling a projection of a scene in three-dimensional space into a composite image by a camera system comprising a plurality of cameras, as described herein.

Calibrating a multi-camera system such that intrinsic, i.e. the internal parameters of each camera model, as well as extrinsic information such as rotation and translation of the cameras to each other are known. Given a distance for the zero parallax plane in relation to the centre of the unifying composite sphere in real-world coordinates, a projection from the image sensor of each camera for each pixel can be carried out according to the camera model used to describe the camera. This projection is performed onto the corresponding camera unit sphere for each camera. From this unit sphere, the unified magnitude of the translation vector for each of the cameras from the centre of the unifying composite sphere to their separate camera sphere centre can be scaled. This scaling allows for the projection of the pixels from each camera unit sphere onto the unifying composite sphere.

According to another aspect of the present invention, a data processing apparatus comprising means for carrying out the computer-implemented method of providing a composite image of a scene using a camera system comprising a plurality of cameras, as described herein.

All camera models share the intrinsic parameters of focal length and centre of the lens in relation to the image sensor. Depending on the model, there are other parameters unique to that model. E.g. the pinhole model can have a multitude, 4 to 14 are common, of algebraic parameter variables in order to describe the skewing effect of the lens being used: a double sphere model has two additional model variables while the field of view camera model only has one additional parameter. Determining these parameters for the camera model is completed as part of the calibration step. In a pre-calibrated muti-camera system, direct alignment is used to place images from adjacent cameras next to one another. When this happens, parallax stemming from the angle of view of the contributing adjacent cameras leads to discrepancies as to the value of the pixel. There are a plethora of algorithms that can be applied to determine a seam line such that the discrepancies of data between the two images are minimized. However, this means that the algorithm would need to be run on every timestep for the pair of images, otherwise the error stemming from discrepancies could not be kept to a minimum. In order to not have to run the seam line finding algorithm on every image capture timestep, a naïve approach can be chosen such that the seam line is fixed to be a static line separating the content of the two images. From a visual perspective, the use of a hard seam line can lead to average, or even bad, results depending on camera orientation and the content of the scene being captured. Thus, additional steps such as blending the content of the two images over the seam line to smooth the appearance of the seam line and to create a more visually intuitive result is performed. Further steps such as compensating for exposure differences amongst cameras, or other effects, can also be addressed as further steps. As mentioned previously, the choosing of a seam line using a computationally expensive algorithm can lead to good stitching results in the presence of parallax, however with high cost. The model described herein provides an additional option to reduce the effect of parallax along the seam line by being able to define a distance of zero parallax and defining an area of reduced parallax effect in relation to this zero parallax plane. This step follows the previously mentioned steps and is easily incorporated into a real-time processing pipeline as the need for expensive seam line finding algorithms are removed.

A computer program which, when running on a computer or when loaded onto a computer, causes the computer to perform the method steps of the computer-implemented method for modelling a projection of a scene in three-dimensional space into a composite image by a camera system comprising a plurality of cameras, as described herein.

A computer program which, when running on a computer or when loaded onto a computer, causes the computer to perform the computer-implemented method of providing a composite image of a scene using a camera system comprising a plurality of cameras, as described herein.

A computer program relates to a program which, when running on at least one processor (for example, a processor) of at least one computer (for example, a computer) or when loaded into at least one memory (for example, a memory) of at least one computer (for example, a computer), causes the at least one computer to perform the above-described method according to the first aspect. The invention may alternatively or additionally relate to a (physical, for example electrical, for example technically generated) signal wave, for example a digital signal wave, carrying information which represents the program, for example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, for example the internet. The invention according to the second aspect therefore may alternatively or additionally relate to a data stream representative of the aforementioned program. In a third aspect, the invention is directed to a non-transitory computer-readable program storage medium on which the program according to the fourth aspect is stored.

Definitions

In this section, definitions for specific terminology used in this disclosure are offered which also form part of the present disclosure.

Computer Implemented Method

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
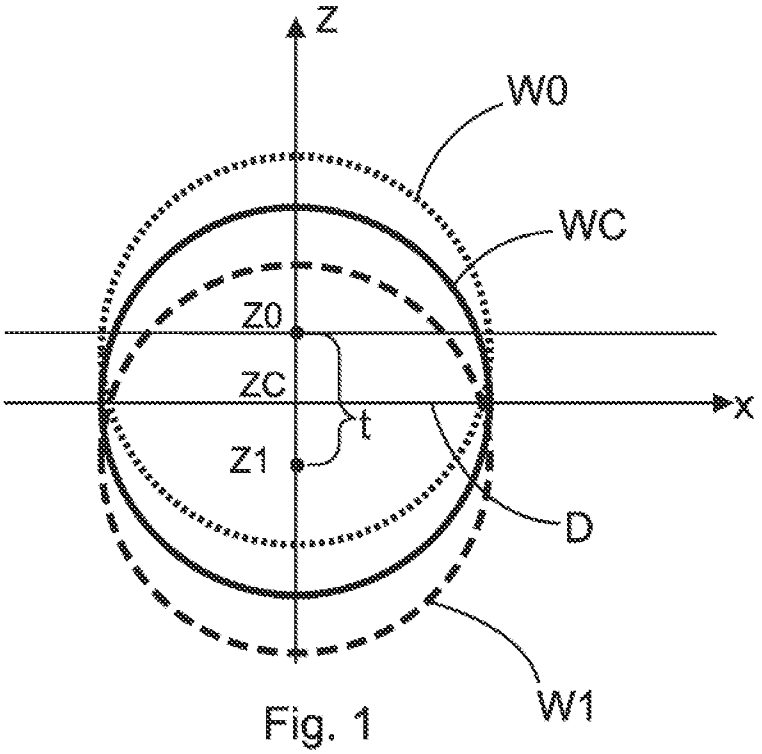
FIG. 1 illustrates a schematic view of the camera system with real-world measurements in a real-world coordinate system.

FIG. 1 illustrates a schematic view of the camera system with real-world measurements in a real-world coordinate system. In the illustrated scenario, the camera system comprises a first camera and a second camera. The first camera is represented by a first camera sphere W0, wherein a centre of the first camera sphere W0 is a first sphere centre Z0. The second camera is represented by a second camera sphere W1, wherein a centre of the second camera sphere W1 is the second sphere centre Z1. In the real world, the first camera and the second camera cannot physically be at the same position in the camera system. Thus, there is an extrinsic distance t between the first camera and the second camera. The first sphere centre Z0 and the second sphere centre Z1 are thus distanced to each other by the extrinsic camera distance t. In this case, the offset between the first sphere centre and the second sphere centre is in z-direction of a three dimensional x-y-z-coordinate system.

A compositing sphere WC that is used to unify the first camera sphere W0 and the second camera sphere W1 is disposed in the middle between the first camera sphere W0 and the second camera sphere W1 in z-direction. In other words, a centre of the compositing sphere WC, which is referred to as compositing sphere centre ZC is disposed between the first sphere centre Z0 and the second sphere centre Z1 in z-direction.

A radius of the first camera sphere W0, the second camera sphere W1 and the compositing sphere WC is determined by an alignment distance D. The alignment distance D is defined by a distance between the camera system and a point of interest in the scene that that should be projected by using the described model, wherein at the point of interest, a parallax error can be reduced to zero when modelling the projection. In other words, in the compositing image that is modelled by projecting a scene using the illustrated model has no parallax error at pixels that in the real world are distanced to the camera system at the alignment distance.

Figure 2:
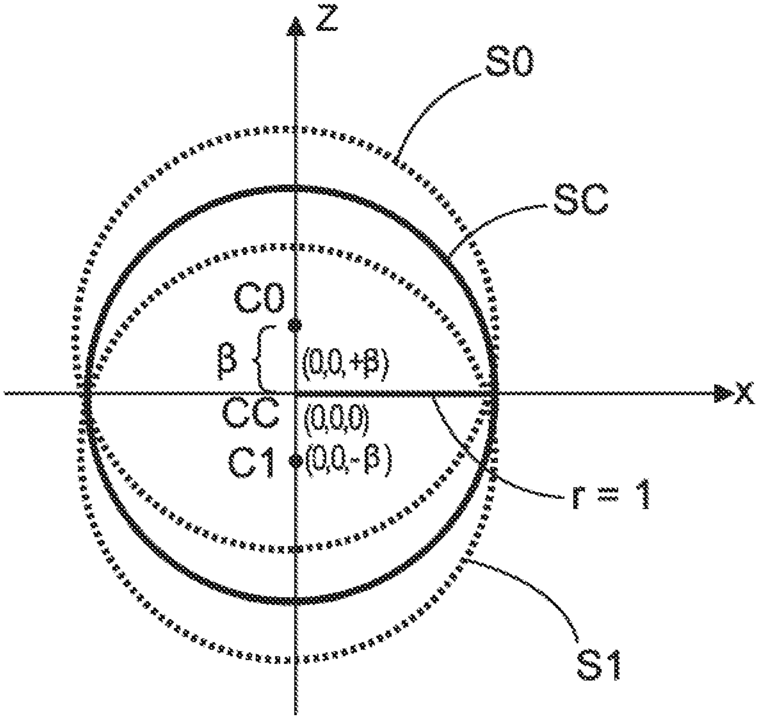
FIG. 2 illustrates a schematic view of the camera system with unified measurements in a camera coordinate system.

FIG. 2 illustrates a schematic view of the camera system with unified measurements in a camera coordinate system. Thus, FIG. 2 illustrates a schematic view of a unified framework that models a projection of a scene onto a composite image. Compared to the real-world measurements of FIG. 1, the first camera sphere W0, the second camera sphere W1 and the compositing sphere WC are unit spheres with a radius of 1, which are referred to as first camera unit sphere S0, second camera unit sphere S1 and compositing unit sphere SC, respectively. In other words, the alignment distance D is scaled down to 1 or the radius of the unit sphere is interpreted to correspond to the alignment distance, Consequently, the extrinsic camera distance needs to be scaled down accordingly. The so called unified distance β is thus defined by:

$$\beta := \text{abs}\left(\frac{t/2}{dist}\right)$$

For example, if the alignment distance is 200 cm and the extrinsic camera distance is 4 cm. β then has a value of $$\frac{\frac{4\text{ cm}}{2}}{200\text{ cm}} = \frac{1}{100}$$

Consequently, a centre of the composite unit sphere SC is referred to as composite unit sphere centre CC, which defined the origin of the camera coordinate system. Thus, a centre of the first camera unit sphere S0 is referred to as first camera unit sphere centre C0 and has the coordinates (0, 0, +β). Thus, a centre of the second camera unit sphere S1 is referred to as second camera unit sphere centre C1 and has the coordinates (0, 0, −β).

Figure 3:
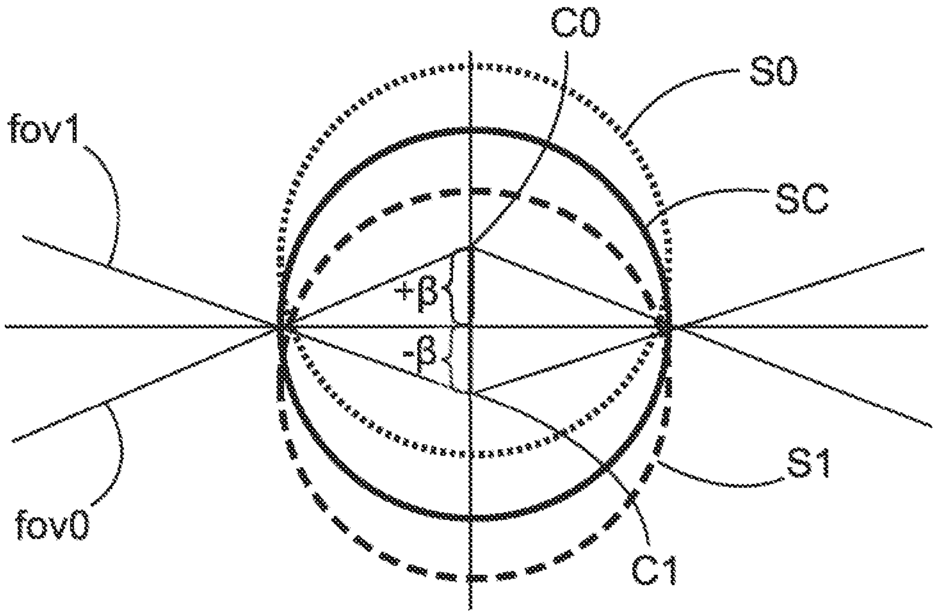
FIG. 3 illustrates a schematic view of the field-of-view of the plurality of cameras.

FIG. 3 illustrates a schematic view of the field-of-view of the plurality of cameras. Depending on the unified offset, the amount of field-of-view of each camera used within the composed image. The bigger the unified offset β, the more apart the two cameras are within the compositing unit sphere, the more field-of-view of each camera is used within the composed image.

Thus, the compositing sphere SC and the alignment distance, and as such the unified offset β that depends on the alignment distance, defines a first field-of-view fov0 of the first camera and the second field-of-view fov1 of the second camera.

Figure 4:
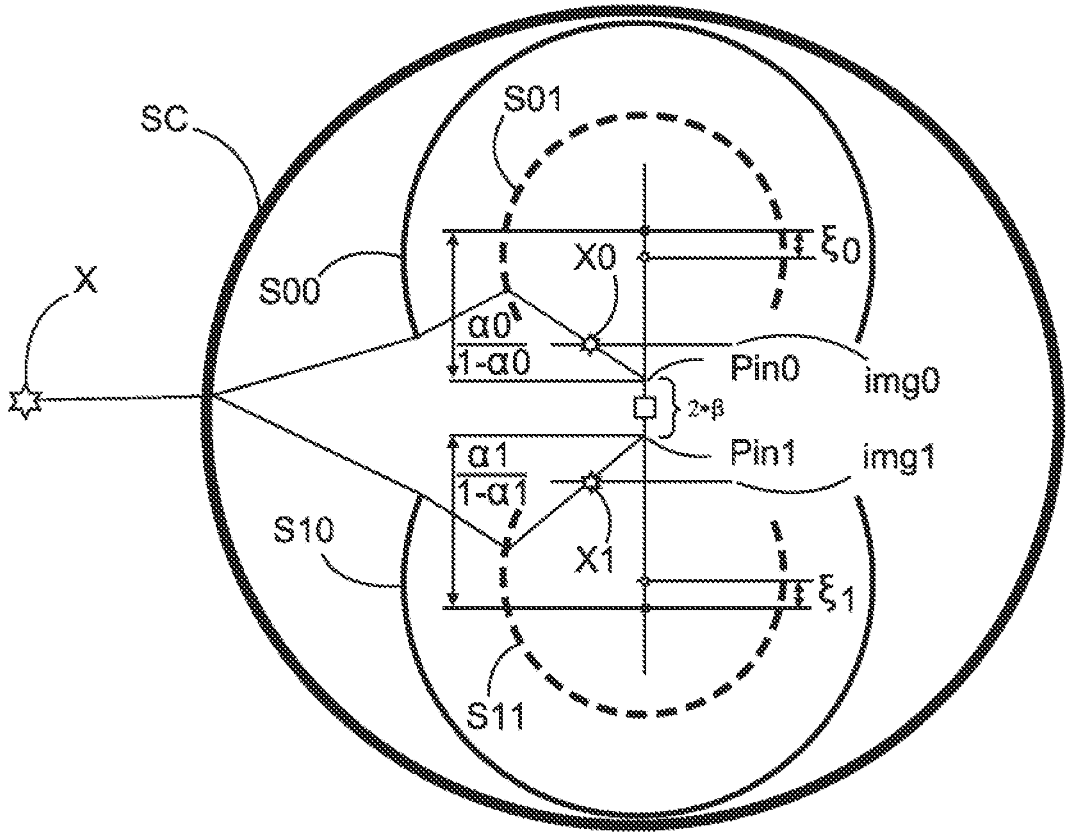
FIG. 4 illustrates a schematic view of the subsequent projection of the method, wherein the camera unit spheres are modelled by a double sphere model.

FIG. 4 illustrates a schematic view of the subsequent projection of the method, wherein the camera unit spheres are modelled by a double sphere model.

In this scenario, the camera system comprises a first camera and a second camera, which are both modelled by a double sphere model. The first camera is represented by a first camera unit sphere S00 and a second camera unit sphere S01 and a first image plane img0. The second camera is represented by a third camera unit sphere S10 and a fourth camera unit sphere S11 and a second image plane img1. A compositing unit sphere SC unifies the aforementioned camera models.

Thus, a first projected point X0 of a composite image is projected consecutively from a first image plane img0 of the first camera using a first pinhole Pin0 onto the first camera's second unit sphere S01, the first camera first unit sphere S00 and the compositing unit sphere SC. Furthermore, a second projected point X1 of the composite image is projected consecutively from a second image plane img1 of the second camera using a second pinhole Pin1 through the second camera's second unit sphere S11, the second camera's first unit sphere S10 and the compositing unit sphere SC. The pinholes for both cameras are offset in the z-direction from each other by two times a unified offset β.

A centre of the first camera's first unit sphere S00 is shifted against the z-direction from a centre of the first camera's second unit sphere S01 by a first sphere shifting factor $\xi_0$. A centre of the second camera's first unit sphere S10 is shifted in the z-direction from a centre of the second camera's second unit sphere S11 by a second sphere shifting factor $\xi_1$, $\xi_0$ and $\xi_1$ are parameters of the corresponding double sphere camera models.

The first camera's pinhole Pin0 is shifted against the z-direction from the centre of the first camera's second unit sphere S01 by a first plane shifting factor wherein the first plane shifting factor is defined by $$\frac{\alpha_0}{1-\alpha_0}$$

The second camera's pinhole Pin1 is shifted against the z-direction from the centre of the second camera's second unit sphere S11 by a second plane shifting factor, wherein the second plane shifting factor is defined by $$\frac{\alpha_1}{1-\alpha_1}$$

$\alpha_0$ and $\alpha_1$ are parameters of the corresponding double sphere camera models.

FIG. 4 illustrates how the compositing unit sphere SC unifies two separate camera models, one for each camera of the camera system and thus allows to consider the unified offset β and as such the extrinsic camera distance between the cameras of the camera system. Thus, the projection of point X of the scene into a composite image can be provided with reduced parallax error that is mainly induced by the extrinsic distance between the cameras of the camera system.

The invention claimed is:

1. A computer-implemented method for modelling a projection of a scene in three-dimensional space into a composite image by a camera system with a plurality of cameras, comprising:

subsequently projecting the scene onto a plurality of camera unit spheres and a compositing unit sphere and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres;

wherein a radius of the camera unit spheres and the compositing unit sphere corresponds to an alignment distance, wherein the alignment distance relates to an extrinsic distance between the camera system and a point of interest.

2. The computer-implemented method of claim 1, wherein subsequently projecting the scene onto a plurality of camera unit spheres and a compositing unit sphere comprises:

transforming the points of the scene from image coordinates into camera coordinates; and transforming the points of the scene from the camera coordinates into extrinsic coordinates, wherein the compositing unit sphere centre defines a coordinate system centre of a camera coordinate system.

3. Computer-implemented method of claim 1, comprising:

before subsequently projecting the scene onto a plurality of camera unit spheres and a compositing unit sphere, the method comprises:

acquiring the alignment distance; and determining a common origin for the compositing unit sphere where extrinsic distances amongst cameras in the plurality of cameras are used;

determining the unified offset (β) using the alignment distance and common origin for the compositing unit sphere.

4. Computer-implemented method of claim 3, wherein the alignment distance is input by a user; and wherein the extrinsic distance is known from the properties of the camera system.

5. Computer-implemented method of claim 1, wherein each camera unit sphere of the plurality of camera unit spheres are each represented by a camera model.

6. Computer-implemented method of claim 1, wherein a camera model comprises a pinhole camera model, a unified camera model, an extended unified camera model, a Kannala-Brandt camera model, a field-of-view camera model or a double sphere camera model.

7. Computer-implemented method of claim 2, wherein the alignment distance relates to an extrinsic distance between the coordinate system centre of the camera coordinate system and a point of interest, where parallax is minimized.

8. Computer-implemented method of claim 1, wherein the composite image is a panorama image.

9. Computer-implemented method of claim 1, wherein a field-of-view used from each of the plurality of cameras for the composite image is dependent on the alignment distance.

10. Computer-implemented method of claim 9, wherein a lower alignment distance leads to a bigger field-of-view used from each of the plurality of cameras for the composite image.

11. Computer-implemented method of claim 1, wherein the plurality of cameras are large field-of-view cameras.

12. Computer-implemented method of claim 11, wherein the large field-of-view cameras comprise a field-of-view that is larger than 180 degrees.

13. Computer-implemented method of claim 11, wherein the large field-of-view cameras comprise a camera with a fish-eye lens.

14. A computer-implemented method of providing a composite image of a scene using a camera system comprising a plurality of cameras, comprising:

pre-computing a representation of the camera system, comprising a plurality of camera unit spheres and a compositing unit sphere;

subsequently projecting the scene onto a plurality of camera unit spheres and a compositing unit sphere, and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres;

wherein a radius of the camera unit spheres and the compositing unit sphere corresponds to an alignment distance, wherein the alignment distance relates to an extrinsic distance between the camera system and a point of interest;

creating a composite image from individual camera images of the plurality of cameras; and applying final distortion correction or optimizing parallax correction to the composite image.

15. The computer-implemented method of claim 14, wherein pre-computing the representation of the camera system comprises:

calibrating the representation of the camera system; and performing direct alignment or feature based alignment.

16. The computer-implemented method of claim 14, wherein creating the composite image from individual camera images of the plurality of cameras comprises:

finding seam lines amongst camera images that are viewing similar parts of the scene; and blending a content, i.e. a number of pixels, of each of the camera images that share a seam line.

17. An apparatus, comprising:

one or more processors executing locally stored instructions to cause the processors to perform operations, including:

subsequently projecting a scene onto a plurality of camera unit spheres and a compositing unit sphere, and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres; and wherein a radius of the camera unit spheres and the compositing unit sphere corresponds to an alignment distance, wherein the alignment distance relates to an extrinsic distance between a camera system and a point of interest.

18. An apparatus, comprising:

one or more processors executing locally stored instructions to cause the processors to perform operations, including:

pre-computing a representation of a camera system, comprising a plurality of camera unit spheres and a compositing unit sphere;

subsequently projecting a scene onto a plurality of camera unit spheres and a compositing unit sphere, and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres;

wherein a radius of the camera unit spheres and the compositing unit sphere corresponds to an alignment distance, wherein the alignment distance relates to an extrinsic distance between the camera system and a point of interest;

creating a composite image from individual camera images of the plurality of cameras; and applying final distortion correction or optimizing parallax correction to the composite image.

19. A non-volatile computer readable media comprising instructions which, when executed by at least one processor, causes the at least one processor to:

subsequently projecting a scene onto a plurality of camera unit spheres and a compositing unit sphere, and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres; and wherein a radius of the camera unit spheres and the compositing unit sphere corresponds to an alignment distance, wherein the alignment distance relates to an extrinsic distance between a camera system and a point of interest.

20. A non-volatile computer readable media comprising instruction which, when executed by at least one processor causes the at least one processor to:

pre-compute a representation of a camera system, comprising a plurality of camera unit spheres and a compositing unit sphere;

subsequently project a scene onto a plurality of camera unit spheres and a compositing unit sphere, and;

wherein each camera unit sphere of the plurality of camera unit spheres represents one camera of the plurality of cameras, respectively;

wherein the compositing unit sphere unifies the plurality of camera unit spheres, wherein a compositing unit sphere centre of the compositing unit sphere is equally distanced by a unified offset (β) to each camera unit sphere centre of the plurality of camera unit spheres;

wherein a radius of the camera unit spheres and the compositing unit sphere corresponds to an alignment distance, wherein the alignment distance relates to an extrinsic distance between the camera system and a point of interest;

create a composite image from individual camera images of the plurality of cameras; and apply final distortion correction or optimizing parallax correction to the composite image.

* * * * *